(12) United States Patent
Niem et al.

(10) Patent No.: US 9,025,033 B2
(45) Date of Patent: May 5, 2015

(54) SURVEILLANCE CAMERA AND METHOD FOR CALIBRATING THE SURVELLIANCE CAMERA USING A CALIBRATION TOOL

(75) Inventors: Wolfgang Niem, Hildesheim (DE); Wolfgang Niehsen, Bad Salzdetfurth (DE); Hartmut Loos, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 1286 days.

(21) Appl. No.: 12/089,469

(22) PCT Filed: Jun. 14, 2007

(86) PCT No.: PCT/EP2007/055897
§ 371 (c)(1),
(2), (4) Date: Apr. 7, 2008

(87) PCT Pub. No.: WO2008/009520
PCT Pub. Date: Jan. 24, 2008

(65) Prior Publication Data
US 2008/0211910 A1    Sep. 4, 2008

(30) Foreign Application Priority Data
Jul. 18, 2006  (DE) .......................... 10 2006 033 147

(51) Int. Cl.
H04N 5/225   (2006.01)
H04N 5/232   (2006.01)
H04N 7/00    (2011.01)
H04N 17/00   (2006.01)
G06T 7/00    (2006.01)
G08B 13/196  (2006.01)
H04N 7/18    (2006.01)

(52) U.S. Cl.
CPC ........ *G06T 7/0018* (2013.01); *G08B 13/19656* (2013.01); *G08B 13/19663* (2013.01); *H04N 7/181* (2013.01)

(58) Field of Classification Search
CPC ........... G06T 7/0018; G08B 13/19656; G08B 13/19663; H04N 7/181
USPC ............................. 348/143, 175, 211.4, 375
See application file for complete search history.

(56) References Cited

U.S. PATENT DOCUMENTS

| | | | | |
|---|---|---|---|---|
| 4,837,817 A | * | 6/1989 | Maemori | 348/211.4 |
| 5,323,203 A | * | 6/1994 | Maruyama et al. | 396/57 |
| 5,469,211 A | * | 11/1995 | Maruichi et al. | 348/211.2 |
| 5,486,852 A | * | 1/1996 | Arai | 348/211.2 |
| 5,583,796 A | * | 12/1996 | Reese | 702/185 |
| 5,598,243 A | * | 1/1997 | Takagi | 396/51 |
| 5,604,534 A | | 2/1997 | Hedges et al. | |
| 5,786,789 A | * | 7/1998 | Janky | 342/357.4 |

(Continued)

FOREIGN PATENT DOCUMENTS

| | | |
|---|---|---|
| DE | 696 27 487 | 3/2004 |
| WO | 03/021187 | 3/2003 |

OTHER PUBLICATIONS

Bent David Olsen et al: "Calinrating a Camera Network Using . . ." Pattern Recognition 34, 2001, pp. 1105-1117 (in English).

*Primary Examiner* — Daniel C Murray
(74) *Attorney, Agent, or Firm* — Michael J. Striker

(57) ABSTRACT

A surveillance camera is positioned and positionable at a stationary surveillance position for monitoring. The surveillance camera has a calibration tool that is constructed or configured for ascertaining the stationary surveillance position of the surveillance camera.

11 Claims, 3 Drawing Sheets

(56) References Cited

U.S. PATENT DOCUMENTS

| | | | |
|---|---|---|---|
| 5,815,411 A * | 9/1998 | Ellenby et al. | 702/150 |
| 5,999,211 A | 12/1999 | Hedges et al. | |
| 6,002,708 A * | 12/1999 | Fleming et al. | 375/130 |
| 6,054,950 A * | 4/2000 | Fontana | 342/463 |
| 6,226,541 B1 * | 5/2001 | Eppstein et al. | 600/407 |
| 6,437,797 B1 * | 8/2002 | Ota | 345/638 |
| 6,724,922 B1 * | 4/2004 | Vilsmeier | 382/128 |
| 6,751,546 B2 * | 6/2004 | Yamashita | 701/517 |
| 6,943,825 B2 * | 9/2005 | Silvester | 348/113 |
| 7,151,562 B1 * | 12/2006 | Trajkovic | 348/211.13 |
| 7,391,442 B1 * | 6/2008 | Fleischman et al. | 348/222.1 |
| 7,437,062 B2 * | 10/2008 | Holcomb | 396/7 |
| 7,808,525 B2 * | 10/2010 | Katayama | 348/175 |
| 7,839,329 B2 * | 11/2010 | Mao | 342/357.32 |
| 8,284,254 B2 * | 10/2012 | Romanowich et al. | 348/154 |
| 8,292,522 B2 * | 10/2012 | Swarr | 396/427 |
| 8,471,910 B2 * | 6/2013 | Cleary et al. | 348/159 |
| 2001/0015759 A1 * | 8/2001 | Squibbs | 348/232 |
| 2002/0041383 A1 * | 4/2002 | Lewis et al. | 358/1.9 |
| 2002/0105484 A1 * | 8/2002 | Navab et al. | 345/8 |
| 2003/0071914 A1 * | 4/2003 | Wei et al. | 348/375 |
| 2003/0164796 A1 * | 9/2003 | Needham | 342/357.13 |
| 2003/0184654 A1 * | 10/2003 | Kinjo | 348/207.1 |
| 2004/0164858 A1 | 8/2004 | Lin | |
| 2004/0246343 A1 * | 12/2004 | Okuda | 348/207.99 |
| 2005/0165541 A1 * | 7/2005 | Noguchi et al. | 701/200 |
| 2005/0165542 A1 * | 7/2005 | Noguchi et al. | 701/200 |
| 2006/0007308 A1 * | 1/2006 | Ide et al. | 348/143 |
| 2006/0023117 A1 * | 2/2006 | Feldmeier | 348/441 |
| 2006/0033813 A1 | 2/2006 | Provinsal et al. | |
| 2006/0293837 A1 * | 12/2006 | Bennett | 701/200 |
| 2007/0035627 A1 * | 2/2007 | Cleary et al. | 348/159 |
| 2007/0039030 A1 * | 2/2007 | Romanowich et al. | 725/105 |
| 2007/0070190 A1 * | 3/2007 | Yin et al. | 348/36 |
| 2007/0087866 A1 * | 4/2007 | Meadows et al. | 473/409 |
| 2007/0183770 A1 * | 8/2007 | Aoki et al. | 396/428 |
| 2008/0084473 A1 * | 4/2008 | Romanowich | 348/135 |
| 2010/0013933 A1 * | 1/2010 | Broad | 348/159 |
| 2011/0128388 A1 * | 6/2011 | Pai et al. | 348/187 |
| 2011/0256886 A1 * | 10/2011 | Velusamy | 455/456.1 |
| 2012/0087644 A1 * | 4/2012 | Swarr | 396/427 |

* cited by examiner

SURVEILLANCE CAMERA AND METHOD FOR CALIBRATING THE SURVELLIANCE CAMERA USING A CALIBRATION TOOL

PRIOR ART

The invention relates to a surveillance camera, in which the surveillance camera is positioned and/or positionable for surveillance at a stationary surveillance position and has a calibration tool, and to a method for calibrating a surveillance camera or the surveillance camera, and a use of a surveillance camera or the surveillance camera for surveillance of a stationary surveillance position.

Video surveillance systems are typically used for surveillance of streets, intersections, and squares but also of public buildings, museums, and prisons. Such video surveillance systems as a rule comprise many surveillance cameras, which are located at various positions, along with a central surveillance office where the image streams taken by the surveillance cameras are united. The image data streams collected in this way area monitored by surveillance workers on-line, for example, or are evaluated in automated fashion. In the latter case, image processing algorithms are typically used for evaluating the video sequences recorded. Often, moving objects are then separated from the essentially static background and are tracked over time, and alarms are tripped if relevant movements occur. These image processing algorithms employ so-called object segmentation, in which the differences between the current camera image and a so-called scene reference image, which models the static scene background, are evaluated.

As a result, in such image processing algorithms, information is obtained about the size of the segmented image regions/objects and about the speed of the segmented image regions/objects in pixels, or pixels traveled per second.

Video monitoring systems that conversely express the results of the image regions/objects in the scene in metric sizes, such as lengths in meters and speed in meters per second, or the absolute and/or relative positioning in a camera network, require that such camera parameters as the position, orientation and opening angle of the camera or cameras be known. These parameters are usually measured manually, which is complicated, in the installation process; for example, special patterns (sample patterns) are used, or else people run back and forth in front of the video camera.

From a different industrial field, namely taking panoramic aerial images from an airplane, devices are known besides the actual video images and sequences also record other data during flight by means of measurement sensors. For instance, both International Patent Disclosure WO 03/021187 A2 and a German Patent Disclosure DE 696 27 487 T2 show a digital camera system that includes a special panoramic camera as well as a calibration unit; the calibration unit has GPS sensors as well as an IMU (Inertial Measurement Unit) for recording motion information, and on the basis of fusing the GPS and IMU data, the pictures taken by the camera are synchronized with one another, or picture-taking is tripped. This published prior art pertains solely to the special case in which the panoramic cameras are moved during the picture-taking, relative to the region to be photographed. The known video surveillance systems will be considered to be the closest prior art below.

DISCLOSURE OF THE INVENTION

The invention relates to a surveillance camera, a method for calibrating the surveillance camera, and a use of the surveillance camera. Preferred or advantageous embodiments are described in detail in the ensuing description.

The surveillance camera according to the invention is embodied structurally in such a way that for surveillance, it is positionable and/or positioned at a stationary surveillance position. The surveillance position is in particular stationary relative to the surveillance area by the surveillance camera. That is, particularly during the surveillance itself, the relative position of the surveillance position and the surveillance area does not change. The surveillance camera is preferably embodied as a CCD camera, but in principle can be based on any arbitrary camera technology. In particular, both the use of fixedly installed PZT cameras (Pan/Tilt/Zoom) as well as the use of cameras with a fixed viewing field are within the scope of the invention. The optical equipment of the surveillance camera is also in general freely selectable; that is, the surveillance camera may be implemented with a wide angle lens, for instance, or with a 360° fisheye lens attachment.

A calibration tool is provided for reinforcing the calibration of the surveillance camera. The calibration preferably pertains to the determination of conversion factors between sizes taken directly from the pictures from the surveillance camera, in particular pixels or pixels per second, and metric parameters or parameters equivalent to that, such as meters and meters per second, respectively, and the conversion factors in particular take reproduction-specific and/or perspective effects into account.

According to the invention, it is provided that the calibration tool is embodied for ascertaining the stationary surveillance position of the surveillance camera. The stationary surveillance position preferably includes the absolute and/or relative position and/or orientation and/or opening angle of the camera. In particular, the calibration tool is embodied for self-locating on the part of the surveillance camera. Preferably, the surveillance camera is embodied such that the ascertainment of the stationary surveillance position is effected asynchronously and/or in unsynchronized fashion with regard to the picture-taking in the surveillance mode.

The invention is based on the thought that by using this kind of calibration tool, the surveillance camera is directly aware of its absolute or relative position and orientation. Via a computation unit, video surveillance systems even with a plurality of surveillance cameras can thus be calibrated in a short time, for example with regard to a digital map of the surroundings. The data required for the calibration are ascertained in particular without user interaction, with the aid of the calibration tool that is preferably embodied as a sensor unit and computation unit and are then available for the image analysis. In this way, the large amount of manual effort presently required for calibrating surveillance cameras is reduced markedly, especially because the absolute or relative orientation and position and/or the opening angle of the surveillance camera is reliably determined automatically with minimal effort.

In a preferred embodiment, the surveillance camera has a calibration module for calculating the surveillance camera on the basis of the stationary surveillance position. This calibration module is preferably embodied for combining ambient information, in particular digital maps of the surroundings, with the stationary surveillance position of the surveillance camera ascertained by the calibration tool. By evaluation of the ambient information, in particular the digital map of the surroundings, the surveillance camera, and in particular the observation field of the surveillance camera, can be calibrated easily. The calibration module is preferably integrated with the surveillance camera or wired separately, for instance via a data connection, to the surveillance camera and/or connected to the auxiliary calibration module.

Preferably, the calibration tool is embodied as an integral component of the surveillance camera. In this way, a video surveillance system with a plurality of surveillance cameras can be calibrated within an extremely short time, since the individual surveillance cameras automatically determine their stationary surveillance position, so that the effort and expense of installation that arises for calibration is minimized.

In an alternative embodiment, the auxiliary calibration module is embodied as replicably removable and/or placeable from, in or onto the surveillance camera.

Both the surveillance camera and the calibration tool include a mechanical connection, and these connections are embodied in complementary fashion to one another, which permits replicable and/or calibrated mounting of the calibration tool on the camera. A calibration tool embodied in this way, once calibration has been done, can be removed from the surveillance camera and used for further cameras, so that the costs for the individual surveillance cameras can be kept low. Preferably, the calibration tool is embodied for communication with the surveillance camera, especially via the Internet, analog video cable, serially, USB, Firewire, or the like, or via a special interface; in particular, a narrow bandwidth appears sufficient.

In an alternative embodiment, the stationary surveillance position and/or the calibration information for the surveillance camera is stored in memory in the calibration tool and read out centrally in an evaluation device. This last alternative is especially advantageous for already existing installations that already have surveillance cameras installed.

Preferably, it is provided that the ascertained stationary surveillance position and/or calibration information is processed in the surveillance camera, so that the surveillance camera is for instance embodied as a smart camera for outputting results in actual metric parameters, and/or is carried onward from the surveillance camera for instance to an evaluation device or the evaluation device, which in particular is centralized, and/or buffer-stored in the calibration tool and later read out and processed, for example by an evaluation device or the central evaluation device.

In a possible embodiment of the invention, the surveillance camera is embodied for self-monitoring, specifically on the basis of a comparison of the surveillance position and/or calibration information from two or more different times that for instance are more than one hour or one day apart.

In a further preferred embodiment, the calibration tool has means for ascertaining the absolute position and/or the orientation and/or the opening angle of the surveillance camera. The absolute position is expressed for instance in global coordinates. The absolute orientation is preferably also expressed in global coordinates and/or in compass angles.

In particular, the means for ascertaining absolute position information, or in other words the absolute position, orientation and/or opening angle, include an arbitrary selection from among the following devices:

A device for detecting GPS and/or DGPS signals, or in other words for example GPS (Global Positioning System) and/or DGPS (Differential Global Positioning System) devices for determining the surveillance position or a reference point in global coordinates.

A device for detecting Galileo signals, that is, Galileo receivers for determining the surveillance position or a reference point in global coordinates. The aforementioned devices for determining the surveillance position or the reference point in global coordinates are especially well suited for calibration of surveillance cameras used in outdoor areas.

MEMS position sensors for determining pitch angles and roll angles of the surveillance cameras. MEMS (Micro-Electro-Mechanical Systems) of this kind are preferably formed from a combination of mechanical elements, sensors, actuators and/or electronic circuitry on a substrate or chip. By means of the MEMS, acceleration sensors, for instance, or sensors for determining the location can be formed in order to determine an absolute alignment of the surveillance camera or of the calibration tool.

For the same purpose, pendulum position sensors are preferably integrated with the calibration tool.

In addition, alternatively or as a supplement, devices for determining an absolute compass angle are implemented, in particular gyrometer devices or compass devices.

In a further refinement of the invention, the calibration tool has means for ascertaining the relative position and/or relative orientation and/or relative opening angle of the surveillance camera. This relevant position information is preferably expressed in relation to local ambient objects, or in other words relative to a wall, ceiling, and/or the floor, for instance, in the near vicinity of the surveillance camera positioned there. The position information preferably pertains to distances or angles relative to the local ambient objects.

The means for ascertaining the relative position information are also implemented as MEMS position sensors or pendulum position sensors. Alternatively or in addition, a locating device on the basis of WLAN signals is used, and the position of WLAN hotspots within range of the surveillance cameras is utilized, particularly with reliance on cross-location. In addition or alternatively, locating devices based on UWB (Ultra Wide Band) signals or radar, LIDAR, etc., may be used. A further alternative or addition is formed by measuring devices, in particular laser or ultrasound measuring devices, in particular for determining a relative height or a profile in the direct vicinity of the surveillance camera. Preferably, measuring devices with at least three measurement beams are used. Lasers or ultrasonic fan devices may be used for measuring the opening angle of the surveillance cameras.

In a further refinement of the invention, means for determining the absolute position information are combined with means for determining relative position information: For instance, gyro devices and laser or laser fan devices are used for the height measurement with a surveillance camera in a tilted position; the laser is adjusted, in particular in plumb with a vertical measurement plane with the aid of the gyro device. Or, the same combination is used to determine the surveillance position of the surveillance camera in indoor spaces, in which case a horizontal laser or laser fan device is adjusted in particular horizontally with the aid of the gyro device.

Another source of relative position information is formed by an evaluation device that is embodied on the basis of absolute position information and ambient information, in particular digital maps of the surroundings. The absolute camera position and orientation are entered into the digital map of the surroundings, and as a result, the relative surveillance position of the surveillance camera is read out.

Alternatively or in addition, a calibration between recorded image information of the surveillance camera and ambient information, in particular the building plan, can be made; by means of the calibration, the relative position of the surveillance camera is also determined (video map matching).

In a preferred refinement of the invention, the surveillance camera is connected and/or connectable to an in particular stationary plotting device and/or evaluation device via a wireless or cable network. The surveillance camera thus forms part of a video surveillance apparatus which includes one or more surveillance cameras of the type described above and the plotting device and/or evaluation device. In particular, the plotting device and/or evaluation device is embodied, in particular by programming and/or circuitry, for executing algorithms for object segmentation and/or object tracking.

The invention also relates to a method for calibrating a surveillance camera, in particular of the type just described, in which in a first step, global or absolute position information via a stationary surveillance position of the surveillance camera is ascertained. The global position information includes in particular the position in global coordinates, the absolute orientation in compass angles, and/or the pitch angle and/or roll angle. In a second step, relative position information is ascertained by combining the global position information with ambient information. The ambient information is embodied preferably as digital maps of the surroundings or as a building plan or the like.

The relative position information includes the surveillance position of the surveillance camera relative to the surveillance area, such as relative to a room or relative to an intersection. In particular, via the relative position information, distances between the surveillance camera and differential objects in the surveillance area can be learned, so that the surveillance camera can be calibrated for the surveillance area.

In a further, optional step, the thus-ascertained relative position information is refined and/or corrected by means of a measurement of the relative position and/or relative orientation of the surveillance camera in the surveillance area.

In a preferred embodiment of the method, the determination of the global position information is done before the onset of the surveillance mode, that is, before image information is recorded, by the surveillance camera. In a refinement of the invention, position information for calibrating or checking the calibration is refurnished regularly by the calibration tool.

In a further embodiment of the invention, it is provided that the surveillance camera in the uninstalled state stores the last known global position in memory, for instance as a GPS signal, and thereupon records subsequent motion information that occurs as a result of the transporting of the surveillance camera to its surveillance position. By calibration of this information with ambient information, in particular a building plan, the global position inside a building can be determined (tracked map matching). During the surveillance mode, however, it is provided that the stationary surveillance position remains unchanged relative to the surveillance area.

In addition, the use of the surveillance camera disclosed for the stationary surveillance mode is claimed, in particular in conjunction with the disclosed method.

Further characteristics, advantages, and effects of the invention will become apparent from the ensuing description of preferred exemplary embodiments in conjunction with the drawings. Shown are:

EMBODIMENT(S) OF THE INVENTION

Figure 1:
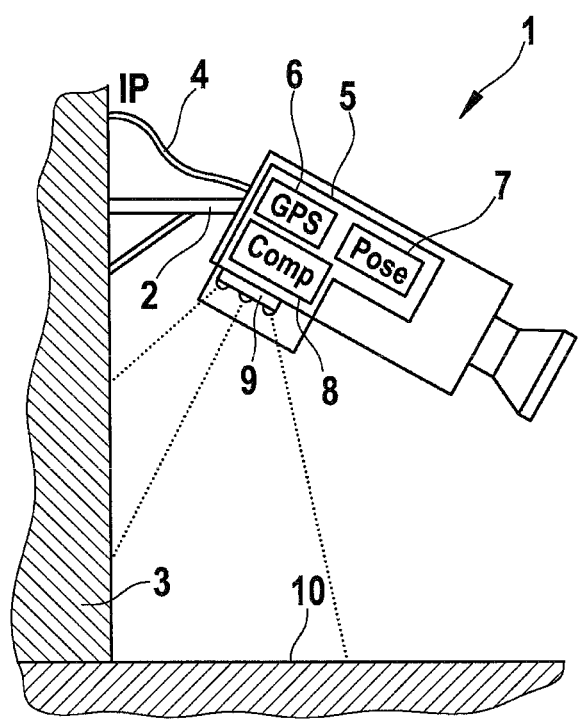
FIG. 1, a schematic lateral top view of a surveillance camera, as one exemplary embodiment of the invention.

FIG. 1, in a schematic lateral top view, shows a surveillance camera 1, which is secured in locally fixed or stationary fashion by means of a fastening device 2 to a wall 3. The surveillance camera 1 is connected via a cable 4 to further surveillance cameras, not shown, and/or to a plotting device and/or evaluation device, also not shown.

All of the surveillance cameras, together with the network and the plotting device and/or evaluation device form a video surveillance system. Such video surveillance systems are used for instance for surveillance of districts, streets, and also public or private buildings, such as museums, schools, universities, or the like.

Calibrating the surveillance camera 1 serves the purpose of enabling sizes of objects, measured in pixels, in the image data streams of the surveillance camera 1 to be converted into metric units. In this way, for a detected object, the actual physical size can be indicated. It is then equally possible to indicate speeds or accelerations of the object in metric parameters. Metric parameters are meters, for units of length, and seconds, for units of time.

For converting the calibration, the surveillance camera 1 has a calibration tool 5, which is integrated with the surveillance camera 1. In alternative embodiments, it is also possible for the calibration tool 5 to be embodied as a removable module, so that the auxiliary calibration module 5 can be used to calibrate a plurality of different surveillance cameras. For that purpose, the auxiliary calibration module 5 and the surveillance camera 1 have a mechanical interface, which enables replicable and/or calibrated reception of the calibration tool 5 on the surveillance camera 1.

In the exemplary embodiment of FIG. 1, the auxiliary calibration module 5 has four sensors, specifically a first sensor 6, which is embodied as a GPS receiver or DGPS receiver; a second sensor 7, which is embodied as a three-axis position sensor; a third sensor 8, which is embodied as an electronic compass; and a fourth sensor 9, which is constructed as a multi-beam, for instance three-beam, laser distance meter.

By means of the first three sensors 6, 7 and 8 mentioned of the calibration tool 5, it is possible by measurement to detect the absolute position and the absolute alignment of the surveillance camera 1 in global coordinates: The first sensor 6 records the absolute position of the surveillance camera 1 in global coordinates. The second sensor 7—again absolutely—records the angle of inclination and/or the roll angle of the surveillance camera 1; the third sensor 8 detects the absolute orientation or alignment of the surveillance camera 1. These three sensors 6, 7 and 8 are already thus capable of detecting the absolute position and orientation of the surveillance camera 1 in global coordinates.

The recorded sensor information—in particular in the case of a removable calibration tool 5—is transmitted by means of known interfaces, such as USB, analog video cable, serially, Firewire, Ethernet, or via a dedicated interface to the surveillance camera 1 or via the connection cable 4 to the plotting device and evaluation device (not shown). In the case of the integrated calibration tool 5 as shown here, the forwarding of the sensor data to the surveillance camera 1 is preferably done internally. Alternatively, it is provided that the calibration tool 5 buffer-stores sensor data that are not read out until at a later time.

The evaluation device, not shown, after receiving the sensor data, in particular the sensor data about the absolute position and orientation of the surveillance camera 1, executes a calibration with ambient information stored in memory, which is stored for instance in the form of digital maps or building plans. In the calibration, the absolute position and orientation of the surveillance camera 1 is input into the ambient information, and the area monitored by the surveillance camera 1, that is, the viewing field of the camera, is ascertained. For the ascertainment, still other data, such as camera parameters and in particular optical parameters, are optionally added. On the basis of the calculated viewing field of the camera, the calibration of the surveillance camera 1 is performed in a further step.

To minimize calibration errors caused by incident measurement imprecision, by means of the fourth sensor 9 a relative position and/or alignment of the surveillance camera 1 relative to its direct vicinity is performed. For that purpose, in the present example, a plurality of laser beams in the form of a beam cluster, originating at the surveillance camera 1 or the calibration tool 5, is cast against the adjoining walls 3 or the floor 10, and the corresponding distances from the surveillance camera 1 are ascertained. These relative position and/or orientation measurement data are used in a further step for fine correction of the surveillance position of the surveillance camera 1.

Figure 2:
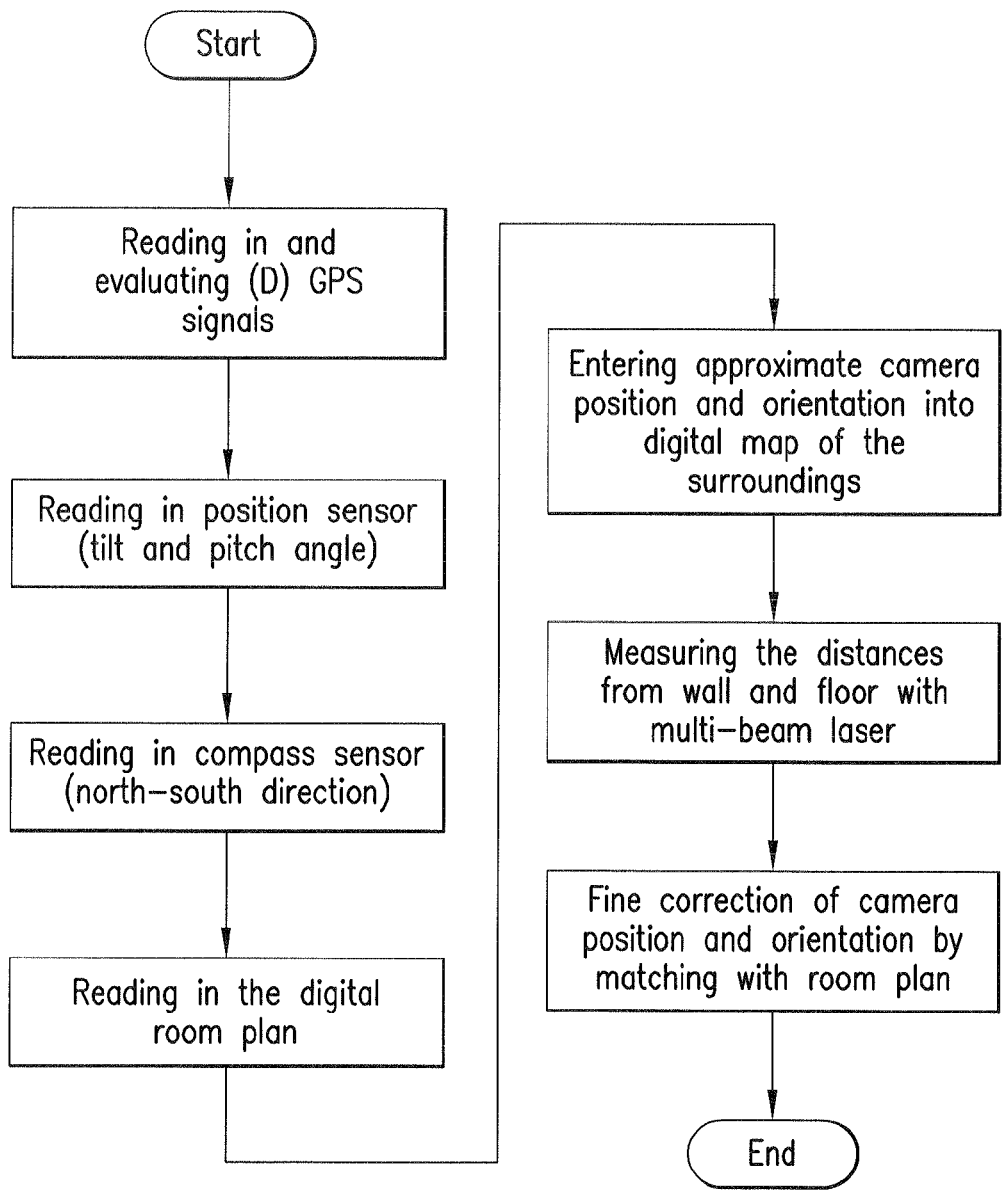
FIG. 2, a flow chart of a calibration of the surveillance camera in FIG. 1, as a first exemplary embodiment of the method of the invention.

FIG. 2 shows a flow chart of a first exemplary embodiment of the method of the invention, which can be performed with the aid of a surveillance system or a surveillance camera 1 of the kind shown in FIG. 1. In a first step, after the start of the calibration operation, a GPS or DGPS signal is read in and evaluated, and in this way the absolute position of the surveillance camera 1 in global coordinates is determined.

In a second step, measurement data of the location sensor 7 are read in, in order to determine the tilt and/or pitch angle of the surveillance camera 1.

In the step that follows, the compass sensor 8 is read out, and on the basis of its measurement data, the north-south direction of the surveillance camera 1 is determined. The read-in measurement data suffice to determine the absolute location of the surveillance camera 1 in global coordinates, and in particular six-dimensionally.

In a further step, a digital room plan or a digital map of the surroundings is read in, and the absolute position and orientation, detected by measurement, of the surveillance camera 1 is input. To minimize measurement imprecision that occurs, in the next step the relative position of the surveillance camera 1 in its surroundings is then determined, by measuring out the distances from the wall and floor using a multi-beam distance meter, in particular the multi-beam laser distance meter 9.

In a further step, a fine correction of the camera position and orientation is then done by means of a matching method using the room plan or the map of the surroundings, on the basis of the measured distances from the wall and floor.

Once the camera position in the digital room plan or the digital map of the surroundings has been determined with high precision, it is possible on the basis of the calculated viewing angle of the surveillance camera 1 to calibrate the actual viewing angle of the surveillance camera 1, in a manner known per se.

Figure 3:
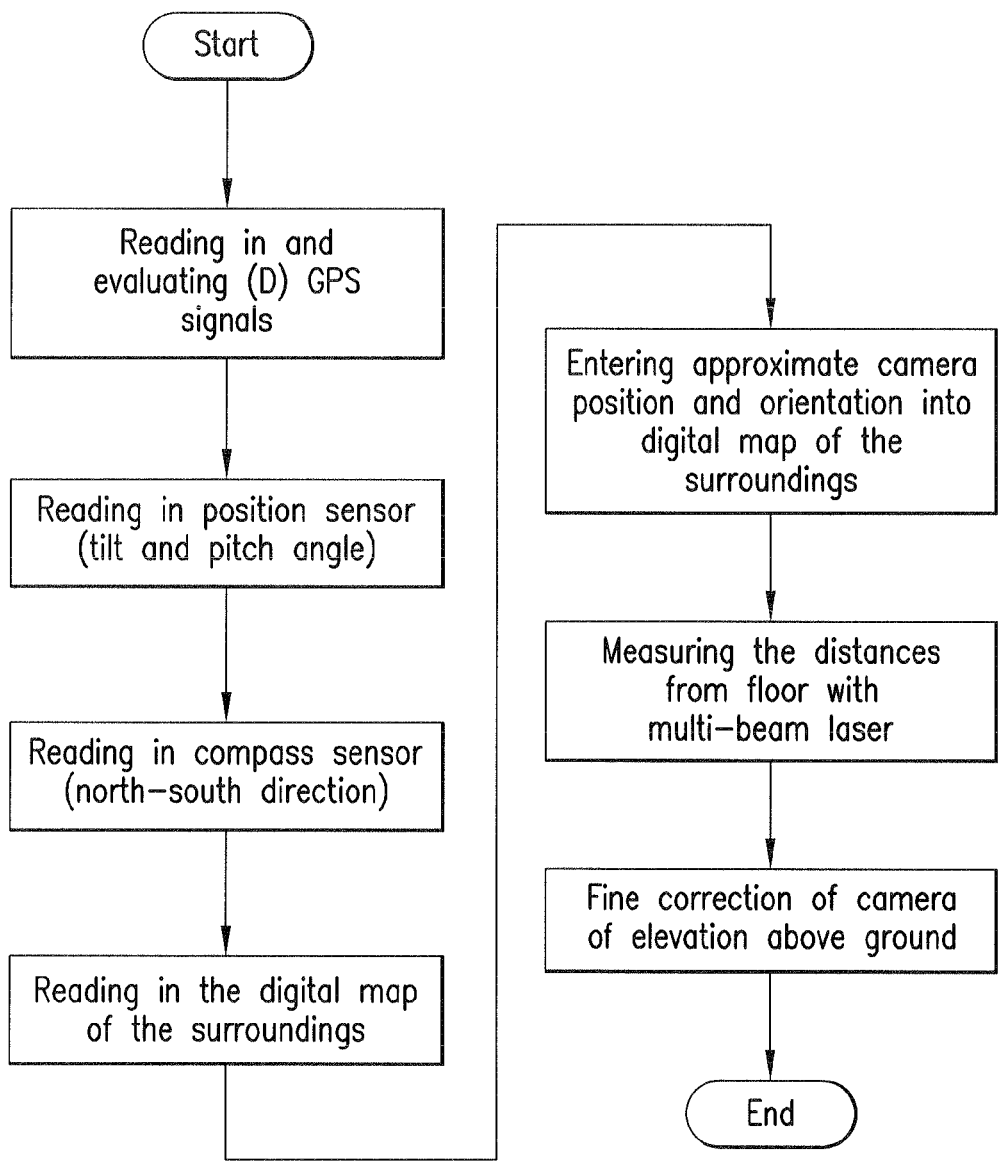
FIG. 3, a flow chart of a calibration of the surveillance camera in FIG. 1, as a second exemplary embodiment of the method of the invention.

FIG. 3 shows a second exemplary embodiment of the method of the invention, in the same view as FIG. 2; once again the surveillance camera 1 of FIG. 1 can be used. In contrast to the method in FIG. 2, the method in FIG. 3 serves to calibrate a surveillance camera 1 outdoors. For the fine correction, in contrast to the method of FIG. 2, the distance between the surveillance camera 1 and the ground is recorded with a, or the, multi-beam laser distance meter 9.

The calibration is performed in particular before the surveillance mode begins. To verify or check the calibration, the calibration operations shown may also be performed or repeated even during the surveillance mode. However, the surveillance mode is characterized by the fact that the surveillance position of the camera 6 does not change, or changes only insignificantly.

The invention claimed is:

1. A surveillance camera (1) for monitoring, which is positioned and/or positionable at a stationary surveillance position, the surveillance camera comprising:
    a calibration tool (5) embodied for ascertaining the stationary surveillance position of the surveillance camera, including means (6, 7, 8) for ascertaining any combination of the group consisting of an absolute position, an orientation and an opening angle of the surveillance camera (1),
    wherein both the surveillance camera (1) and the calibration tool (5) include a mechanical connection, which mechanical connection enables placement of the calibration tool (5) to a calibrated position in or on surveillance camera (1) and removal of the calibration tool (5) from the calibrated position, and
    wherein the mechanical connections on the camera (1) and the calibration tool (5) are configured in a complementary fashion to one another for mounting the calibration tool (5) on the camera (1) using replicable mounting, calibrated mounting or both.

2. The surveillance camera (1) as defined by claim 1, including a calibration module for calibrating the surveillance camera on the basis of the stationary surveillance position.

3. The surveillance camera (1) as defined by claim 1, wherein the calibration tool (5) is embodied as an integral component of the surveillance camera (1).

4. The surveillance camera (1) as defined by claim 1, wherein the means for ascertaining a position information include one or more of the following devices:
    a device (6) for detecting GPS and/or DGPS signals;
    a device for detecting Galileo signals;
    micro electrical mechanical systems (MEMS) position sensors (7) for determining a pitch angle and roll angle;
    pendulum position sensors for determining the pitch angle and roll angle;
    magnetic field sensors for determining one or more orientation angles; and
    a compass device (8) for determining the absolute compass angle.

5. The surveillance camera (1) as defined by claim 1, wherein the calibration tool (5) includes means (9) for ascertaining any combination of the group consisting of a relative position, an orientation and an opening angle of the surveillance camera.

6. The surveillance camera (1) as defined by claim 5, wherein the means for ascertaining relative position information include one, a plurality, and/or all of the following devices:
    micro electrical mechanical systems (MEMS) position sensors for determining a pitch angle and roll angle;
    pendulum position sensors for determining the pitch angle and roll angle;
    a locating device on the basis of wireless local area network (WLAN) signals;
    a locating device on the basis of ultra wide band (UWB) signals;
    a measuring device (9), in particular a laser or ultrasound measuring device; and
    a laser fan device for measuring the opening angle.

7. The surveillance camera (1) as defined by claim 1, wherein an evaluation device, which is embodied for ascertaining relative position information on the basis of the absolute position information and ambient information.

8. The surveillance camera (1) as defined by claim 1, wherein the surveillance camera (1) is connected and/or is connectable to a plotting device, which is stationary, via a wireless or cable network (4).

9. A method for calibrating the surveillance camera (1) as defined by claim 1, comprising steps of:
   ascertaining global or absolute position information via a stationary surveillance position of the surveillance camera (1), and
   ascertaining relative position information by combining the global position information and ambient information.

10. The method as defined by claim 9, further comprising correcting the relative position information by means of a measurement of a relative position, a relative alignment of the surveillance camera (1), or both.

11. A use of a surveillance camera (1) as defined by claim 1 for surveillance from a stationary surveillance position.

* * * * *